United States Patent
Nusier et al.

(10) Patent No.: US 9,908,560 B2
(45) Date of Patent: Mar. 6, 2018

(54) ARTICULATED SLIDING LINKS FOR DEFLECTING A VEHICLE IN A SMALL OFFSET COLLISION

(71) Applicant: Ford Global Technologies, LLC, Dearborn, MI (US)

(72) Inventors: Saied Nusier, Canton, MI (US); Mohamed Ridha Baccouche, Ann Arbor, MI (US); Jamel E. Belwafa, Ann Arbor, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 10 days.

(21) Appl. No.: 15/096,536

(22) Filed: Apr. 12, 2016

(65) Prior Publication Data

US 2017/0291642 A1    Oct. 12, 2017

(51) Int. Cl.
| | |
|---|---|
| *B62D 21/15* | (2006.01) |
| *B62D 25/08* | (2006.01) |
| *B60R 19/02* | (2006.01) |

(52) U.S. Cl.
CPC .......... *B62D 21/152* (2013.01); *B60R 19/023* (2013.01); *B62D 25/08* (2013.01)

(58) Field of Classification Search
CPC ...... B62D 21/152; B62D 25/08; B60R 19/023
See application file for complete search history.

(56) References Cited

U.S. PATENT DOCUMENTS

| | | | |
|---|---|---|---|
| 6,926,322 B2 * | 8/2005 | Browne | B60R 19/40 |
| | | | 293/114 |
| 7,651,132 B2 | 1/2010 | Cho et al. | |
| 8,807,632 B2 * | 8/2014 | Ramoutar | B60R 19/24 |
| | | | 293/132 |
| 8,824,151 B2 | 9/2014 | Ghannam et al. | |
| 8,985,258 B1 | 3/2015 | Midoun et al. | |
| 8,991,544 B1 * | 3/2015 | Stratten | B60R 19/04 |
| | | | 180/274 |
| 9,126,550 B2 | 9/2015 | Nusier et al. | |
| 9,193,318 B2 | 11/2015 | Barbat et al. | |

FOREIGN PATENT DOCUMENTS

| | | | |
|---|---|---|---|
| JP | 2011234494 A | 11/2011 | |
| JP | 2011234495 A | 11/2011 | |

* cited by examiner

*Primary Examiner* — D Glenn Dayoan
*Assistant Examiner* — Melissa A Black
(74) *Attorney, Agent, or Firm* — Jason Rogers; Brooks Kushman P.C.

(57) ABSTRACT

A collision countermeasure apparatus for a vehicle includes a longitudinally extending frame rail that defines a transverse opening adjacent a front end. An extension is partially received in a bumper that defines an open end. A pin is received in the transverse opening and has an outer end pivotally connected by a joint to an outboard end of the extension. Collisions outboard of the frame rail drive the extension into the pin and the pin into the rail to laterally displace the vehicle. Collisions inboard of the rail slide the extension outwardly from the bumper and pivot the extension and pin toward each other. Collisions inboard of the rail shift the pin laterally outwardly from the transverse opening.

17 Claims, 5 Drawing Sheets

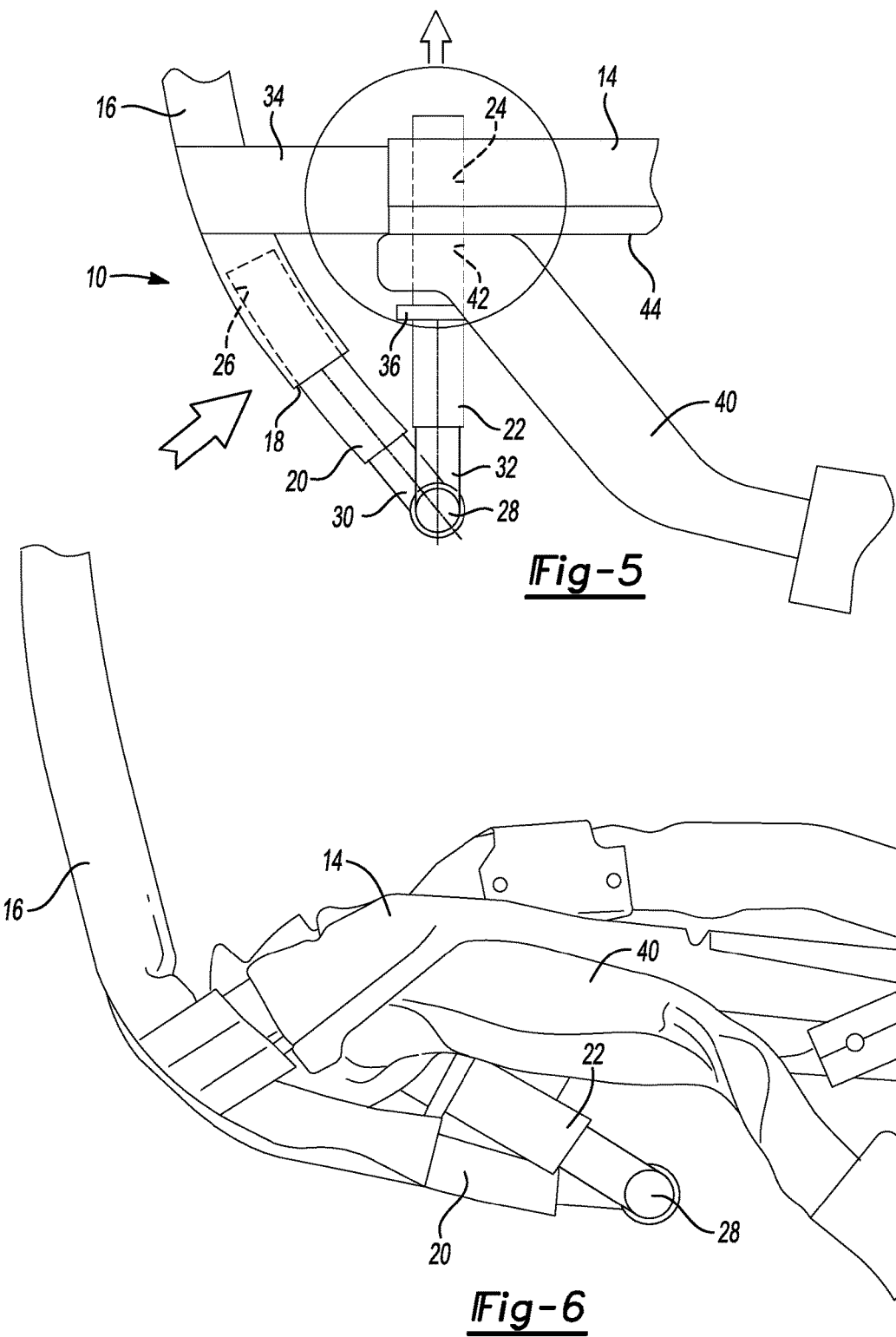

ARTICULATED SLIDING LINKS FOR DEFLECTING A VEHICLE IN A SMALL OFFSET COLLISION

TECHNICAL FIELD

This disclosure relates to body structures of vehicles that deflect a vehicle laterally in response to a small offset collision with a rigid barrier.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provide the primary support for the vehicle body.

A test known as the Small Offset Rigid Barrier (SORB) test simulates small offset frontal collisions against a rigid barrier. In the proposed test, the vehicle impacts a rigid barrier having a six inch pole-like radius on one corner with a 25% overlap at 40 MPH. The impact is outboard of the frame rails so that the frame rails do not provide as much resistance to intrusion into the passenger compartment as in the case of impacts between the frame rails.

The weight of land vehicles is being substantially reduced to improve fuel efficiency. Vehicles are currently being designed to reduce the weight of the vehicle with a parallel objective of not compromising performance or crashworthiness. The problems addressed by this disclosure include meeting SORB test requirements while reducing vehicle weight and reducing manufacturing costs.

The above problems and other problems are addressed by this disclosure as summarized below.

SUMMARY

According to one aspect of this disclosure, a collision countermeasure apparatus is disclosed that comprises a longitudinally extending frame rail that defines a transverse opening adjacent a front end. An extension is partially received in a bumper that defines an open end. A pin is received in the transverse opening and has an outer end pivotally connected by a joint to an outboard end of the extension. Collisions outboard of the rail drive the extension into the pin and the pin into the rail.

According to other aspects of this disclosure, collisions inboard of the rail slide the extension outwardly from the bumper and pivot the extension and pin toward each other. Collisions inboard of the rail shift the pin laterally outwardly from the transverse opening.

The joint may be a hinge connecting the extension and the pin at the outer end of the extension and an outer end of the pin. A stopper may be provided on the pin that prevents the pin from sliding through the transverse opening defined by the frame rail in the collision. The stopper may be a ring secured to the pin.

The rail supports a vehicle and a lateral force exerted by the pin on the frame rail laterally displaces the vehicle. A front quarter panel support rail may be attached to an outer side of the rail and may define a support rail opening that is aligned with the opening in the rail that receives the pin. The pin may include a stopper that engages the front quarter panel support rail to prevent the pin from sliding through the support rail opening and the opening defined by the rail in the collision.

According to another aspect of this disclosure, a collision countermeasure apparatus is disclosed that comprises a first link having an inner end received in a bumper beam and a second link slideably received in an opening defined by a frame rail. The second link is pivotally connected to an outer end of the first link at a location spaced outboard of the frame rail. In an offset collision outboard of the frame rail, the first link is driven into the second link that, in turn, applies a lateral force to the frame rail.

According to other aspects of this disclosure, in a head-on collision between the frame rail and a second frame rail the first link slides telescopically outward from the bumper beam and causes the second link to slide outward from the frame rail and pivot closed relative to the first link.

The collision countermeasure apparatus may further comprise a hinge connecting the first link and the second link at the outer end of the first link and an outer end of the second link.

A stopper may be provided on the second link that prevents the second link from sliding through the opening defined by the frame rail in the offset collision. The stopper may be a ring secured to the second link.

The lateral force may function to deflect the frame rail laterally. The frame rail supports a vehicle that is laterally displaced when the lateral force applied by the second link is applied to the frame rail.

Depending upon the vehicle front end structure, a front quarter panel support rail may be attached to an outer side of the frame rail that defines a support rail opening that is aligned with the opening in the frame rail and receives the second link. A stopper may be provided on the second link that engages the front quarter panel support rail to prevent the second link from sliding through the support rail opening and the opening defined by the frame rail in the offset collision.

The above aspects of this disclosure and other aspects will be described below with reference to the attached drawings.

BRIEF DESCRIPTION OF THE DRAWINGS

FIG. 5 is a fragmentary top plan view of the collision countermeasure apparatus in a collision with an object outboard of the frame rail.

FIG. 6 is one example of a computer simulated collision outboard of the frame rail.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Relative terms for spacial relationships as referred to in this disclosure should be understood as being vehicle directions with the vehicle having a "longitudinal direction" that extends from the front of the vehicle to the rear of the vehicle. The "lateral direction" extends in the cross-vehicle direction. A "centerline" of the vehicle extends in the longitudinal direction and is at the lateral center of the vehicle. For example, the term "outboard of the frame rails" refers to a side of the frame rails that is on the opposite side of the frame rails from the centerline. The "outward direction" is the direction extending away from the centerline.

The term "SORB" refers to a Small Offset Rigid Barrier test the replicates a collision of a vehicle with a rigid barrier that is outboard of the frame rails and involves less than 25% of the width of the vehicle. The term "NCAP" generally refers to a series of New Car Assessment Program tests and one of the tests is referred to as the "NCAP-Pulse" test in which a vehicle collides in a full frontal crash with a rigid barrier at a speed of 35 MPH between the frame rails of the vehicle. For brevity, the NCAP-Pulse test is referred to herein as simply "NCAP."

Figure 1:
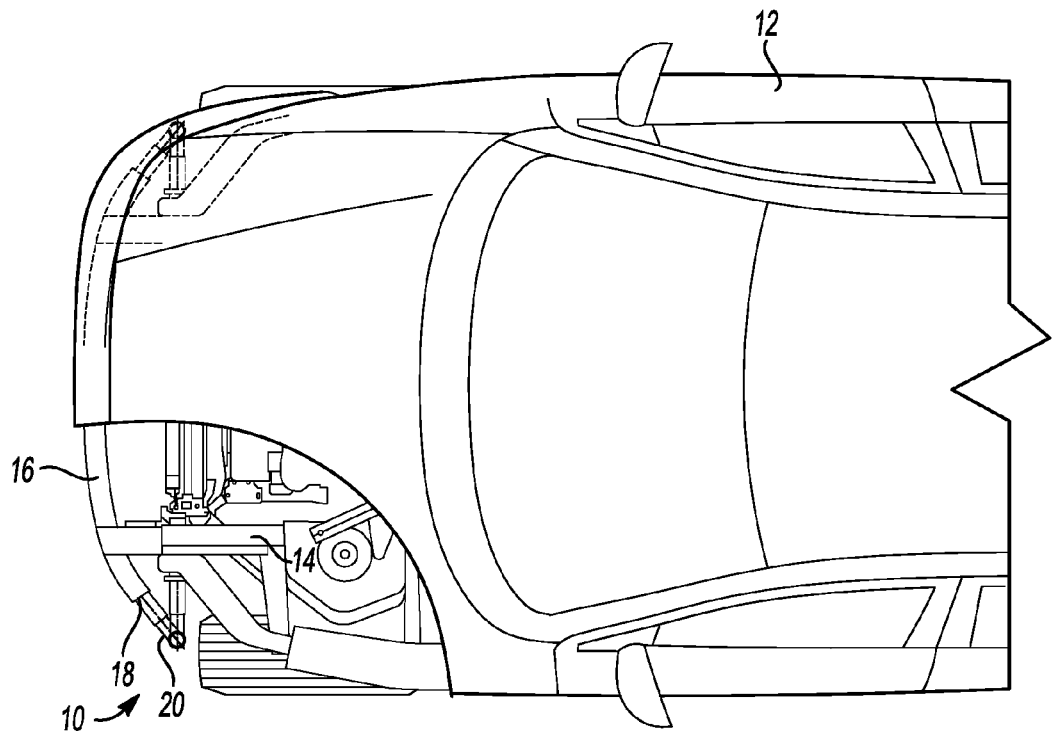
FIG. 1 is a fragmentary top plan view with part of the hood and front quarter panel removed to show the collision countermeasure apparatus.

Referring to FIG. 1, a collision countermeasure apparatus 10 made according to the present disclosure is illustrated on a vehicle 12. Two collision countermeasure apparatuses 10 are provided on the vehicle 12 to protect portions of the vehicle 12 that are outboard of the frame rails 14. A bumper 16 is secured to the vehicle. The bumper 16 extends laterally across the vehicle and partially outboard of the frame rails 14. The bumper 16 defines an open end 18 in which an extension 20, or first link, is assembled.

Figure 2:
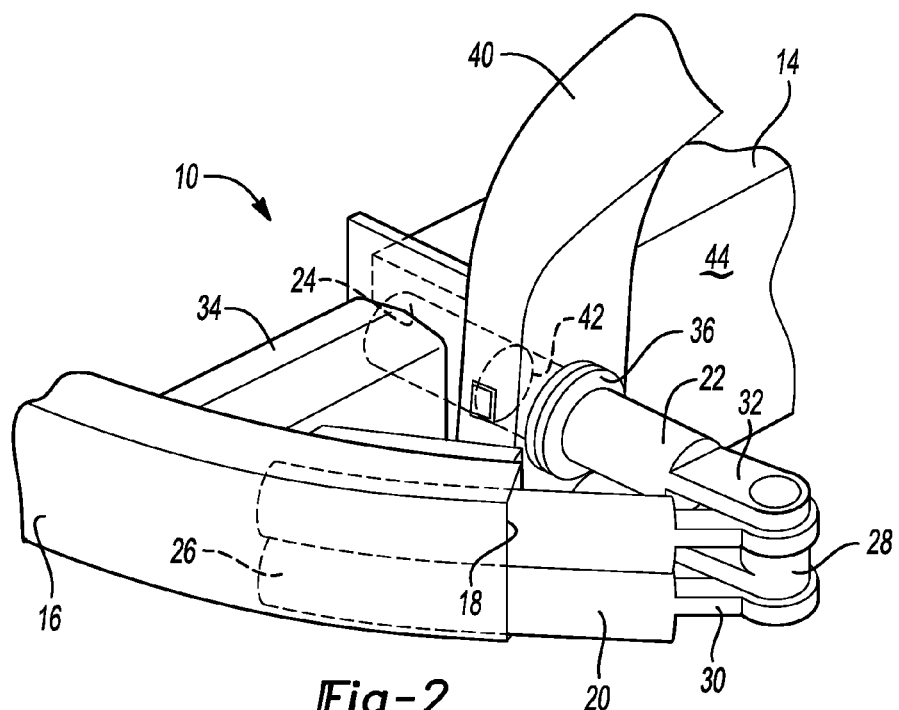
FIG. 2 is a fragmentary perspective view of the collision countermeasure apparatus attached to the frame rail and bumper.

Referring to FIGS. 1 and 2, a pin 22, or second link, is assembled into a transverse opening 24 in the frame rail 14. As used herein, the term "transverse" refers to the cross vehicle or lateral direction. It should be understood that the transverse opening 24 defined by the frame rail 14 extends in the lateral or transverse direction. An inner end 26 of the extension 20, or first link, is received in the open end 18 of the bumper 16. A pivot joint 28, or hinge, is provided at an outboard end 30 of the extension 20 and at an outer end 32 of the pin.

Figure 3:
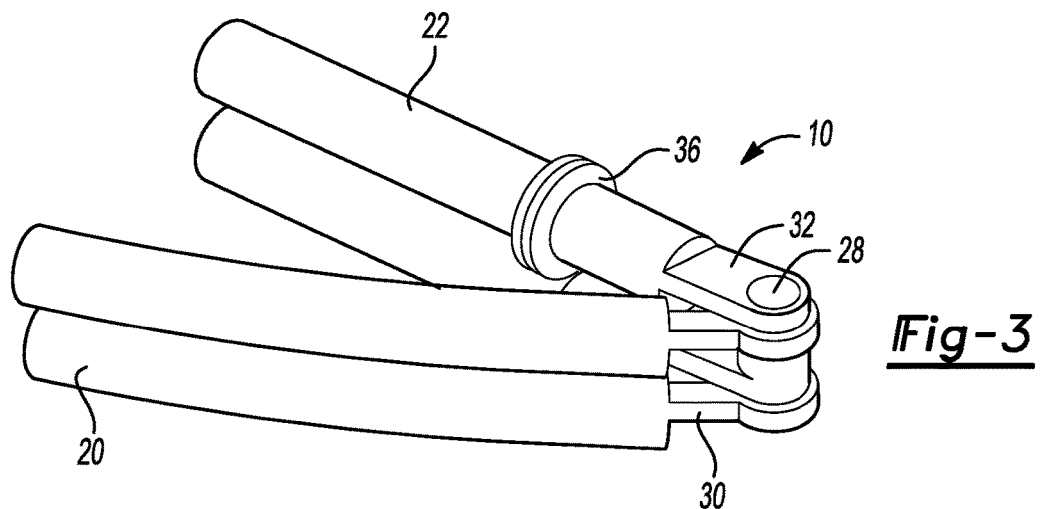
FIG. 3 is a perspective view of the collision countermeasure apparatus in isolation.

Referring to FIGS. 2 and 3, the collision countermeasure apparatus 10 is shown in greater detail. The bumper 16 is attached through a crush can 34 to the front frame rail 14. The pin 22, or second link, is received in the transverse opening 24 formed in the frame rail 14. The pin 22 includes an outer end 32 that is connected to the outboard end 30 of the extension 20 by a joint 28. The joint 28 is a hinge pin or other type of hinging connection that permits the extension 20 and pin 22 to pivot toward each other in some collision circumstances that will be more fully described below with reference to FIG. 4. A stopper ring 36 is provided on the pin 22 that is spaced from the frame rail 14 and (depending upon the structure of the vehicle body) spaced from the front quarter panel support rail 40. In some vehicles, the front quarter panel support rail 40 is tied to the outer side of the frame rail 14. The front quarter panel support rail 40 may define a support rail opening 42. The pin 22 is inserted first through the support rail opening 42 and then into the transverse opening 24 of the frame rail 14.

Figure 4:
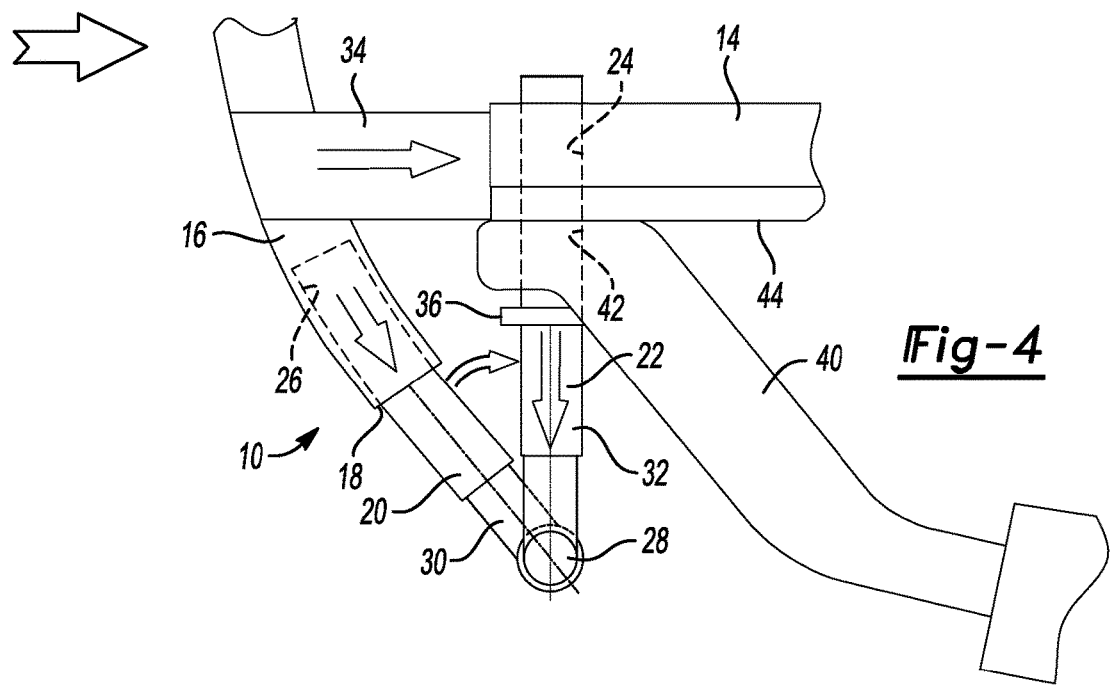
FIG. 4 is a fragmentary top plan view of the collision countermeasure apparatus shown in a collision with an object inboard of the frame rails on the bumper.

Referring to FIG. 4, the collision countermeasure apparatus 10 of the present disclosure is shown in a collision inboard of the frame rail 14 which is known as a frontal collision, or NCAP. The bumper 16 is driven longitudinally into the crush can 34 that connects the bumper 16 to the frame rail 14. In response to the full frontal collision, the pin 22 is shifted in the outboard direction. At the same time, the extension 20 pivots toward the pin 22 as indicated by the arcuate arrow between the extension 20 and pin 22. By shifting the pin 22 in the outboard direction and pivoting the extension 20 towards the pin 22 in a scissor-like motion, the countermeasure apparatus 10 minimizes interference with the energy absorbing function of the crush can.

As shown in FIG. 5, a collision outboard of the frame rail 14 is illustrated by the arrow in front of the bumper 16. In a collision outboard of the frame rail 14, or a SORB collision, the extension 20 is driven towards the pin 22. The pin 22 is driven toward the frame rail 14 until the stopper 36 contacts the front quarter panel support rail 42, or frame rail 14 if there is no support rail 42. The pin 22 exerts a lateral force on the front quarter panel support rail 40 (or frame rail 14) and, in turn, on the frame rail 14 to laterally displace the vehicle away from the barrier.

As shown in FIG. 6, after a collision with a small offset rigid barrier, the extension 20 is deformed rearwardly while the pin 22 is driven into the frame rail 14 through the front quarter panel support rail 40. By driving the pin 22 into the frame rail, the vehicle is laterally displaced as shown in the attached two graphs of FIGS. 8 and 9.

Figure 7:
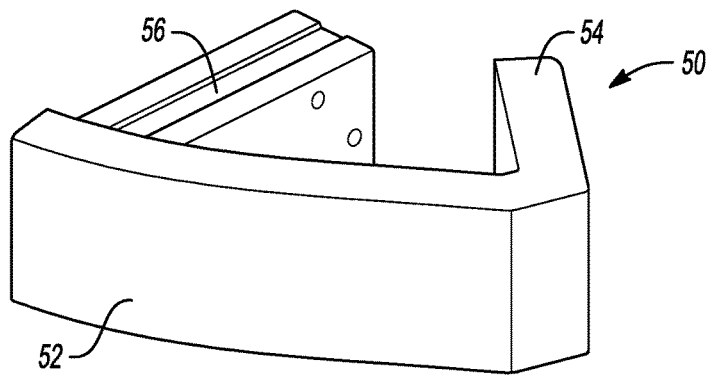
FIG. 7 is a perspective view of a prior art static hook collision countermeasure apparatus made according to the prior art.

Referring to FIG. 7, a prior art static hook 50 is illustrated that includes a front wall 52 and a return leg 54. The front wall 52 is attached to a frame rail 56 and extends outboard of the frame rail 56. The return leg 54 extends from the outermost end of the front wall 52 toward the frame rail 56, but is not connected to the frame rail 56.

Figure 8:
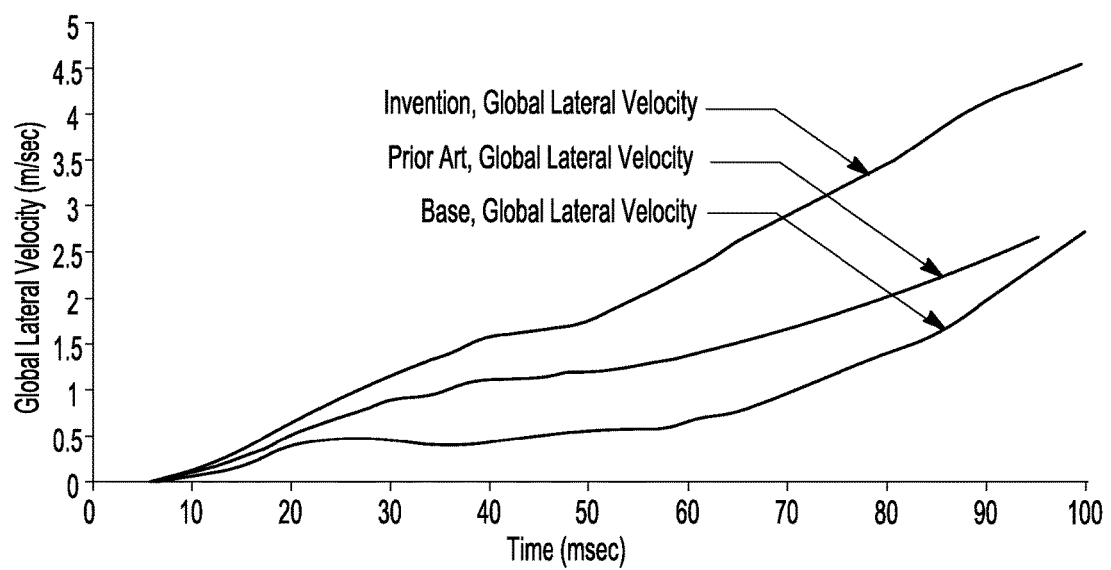
FIG. 8 is a chart showing the global lateral velocity over time comparing a base vehicle without any collision countermeasure apparatus outboard of the frame rail; a prior art embodiment made according to FIG. 7; and for the collision countermeasure apparatus shown in FIGS. 1-5.

Referring to FIG. 8, a chart is provided of the global lateral velocity in meters per second for a time period measured in milliseconds from the time of a collision with a small offset rigid barrier outboard of the frame rails 14. A base vehicle that does not include any collision countermeasure apparatus for a small offset collision is compared to a collision countermeasure apparatus illustrated in FIG. 7 and to the collision countermeasure apparatus of FIGS. 1-5. In the base vehicle test simulation, the global lateral velocity at 90 ms is approximately 2 msec; with the embodiment of FIG. 7 at 90 ms, the lateral velocity is approximately 2.4 m/sec; with the embodiment of FIGS. 1-5, the global lateral velocity is approximately 4.1 m/sec.

Figure 9:
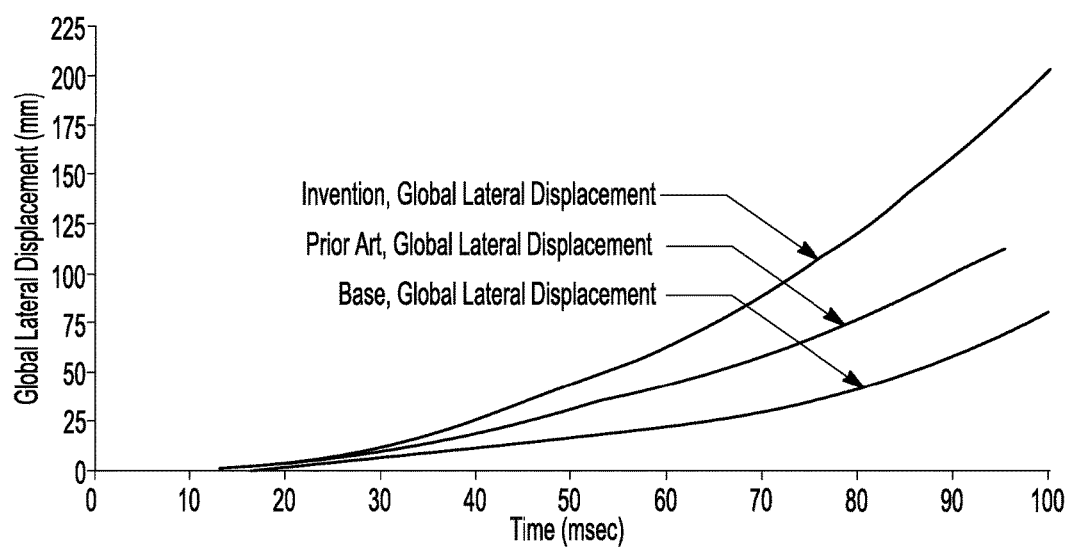
FIG. 9 is a chart of the global lateral displacement over time for the base vehicle without a collision countermeasure apparatus; the prior art with the collision countermeasure apparatus shown in FIG. 7; and for the invention as shown in FIGS. 1-5.

Similarly, in FIG. 9, the global lateral displacement was compared in simulated tests of the base vehicle compared to the embodiment of FIG. 7 and the embodiment of FIGS. 1-5. The global lateral displacement of the base vehicle at 90 msec is approximately 55 mm. The global lateral displacement of the embodiment of FIG. 7 at 90 msec is approximately 100 mm. With the embodiment of FIGS. 1-5, the global lateral displacement at 90 msec is approximately 190 mm. Based upon the simulated test represented by the charts of FIGS. 8 and 9, the collision countermeasure apparatus 10 of FIGS. 1-5 has greater global lateral velocity and greater global lateral displacement compared to the embodiment of FIG. 7 or the base model that does not include a collision countermeasure apparatus outboard of the frame rail.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A collision countermeasure apparatus comprising:
   a rail extending longitudinally and defining a transverse opening adjacent a front end;
   a bumper defining an open end;
   an extension partially received in the open end;
   a pin received in the transverse opening;
   a joint pivotally connecting an outboard end of the extension to an outer end of the pin, wherein collisions outboard of the rail drive the extension into the pin and the pin into the rail; and
   a front quarter panel support rail attached to an outer side of the rail that defines a support rail opening that is aligned with the opening in the rail and receives the pin.

2. The collision countermeasure apparatus of claim 1 wherein collisions inboard of the rail slide the extension outwardly from the bumper and pivot the extension and pin toward each other.

3. The collision countermeasure apparatus of claim 2 wherein collisions inboard of the rail shift the pin laterally outwardly from the transverse opening.

4. The collision countermeasure apparatus of claim 1 wherein the joint is a hinge connecting the extension and the pin at the outer end of the extension and an outer end of the pin.

5. The collision countermeasure apparatus of claim 1 further comprising:
   a stopper provided on the pin that prevents the pin from sliding through the transverse opening defined by the rail in the collision.

6. The collision countermeasure apparatus of claim 5 wherein the stopper is a ring secured to the pin.

7. The collision countermeasure apparatus of claim 1 further comprising a vehicle supported on the rail, wherein the pin exerts a lateral force on the rail, and wherein the vehicle is laterally displaced by the lateral force.

8. The collision countermeasure apparatus of claim 1 further comprising:
   a stopper provided on the pin that engages the front quarter panel support rail to prevent the pin from sliding through the support rail opening and the opening defined by the rail in the collision.

9. A collision countermeasure apparatus comprising:
   a first link having an inner end received in a bumper beam; and
   a second link slideably received in an opening defined by a frame rail and pivotally connected to an outer end of the first link spaced outboard of the frame rail, wherein an offset collision outboard of the frame rail drives the first link into the second link that applies a lateral force to the frame rail.

10. The collision countermeasure apparatus of claim 9 wherein a head-on collision between the frame rail and a second frame rail drives the first link to slide telescopically outward from the bumper beam and causes the second link to slide outward from the frame rail and pivot closed relative to the first link.

11. The collision countermeasure apparatus of claim 9 further comprising:
    a hinge connecting the first link and the second link at the outer end of the first link and an outer end of the second link.

12. The collision countermeasure apparatus of claim 9 further comprising:
    a stopper provided on the second link that prevents the second link from sliding through the opening defined by the frame rail in the offset collision.

13. The collision countermeasure apparatus of claim 12 wherein the stopper is a ring secured to the second link.

14. The collision countermeasure apparatus of claim 9 wherein the lateral force deflects the frame rail laterally.

15. The collision countermeasure apparatus of claim 14 wherein the frame rail supports a vehicle and the vehicle is laterally displaced when the lateral force deflects the frame rail.

16. The collision countermeasure apparatus of claim 9 further comprising:
    a front quarter panel support rail attached to an outer side of the frame rail that defines a rail opening that is aligned with the opening in the frame rail and receives the second link.

17. The collision countermeasure apparatus of claim 16 further comprising:
    a stopper provided on the second link that engages the front quarter panel support rail to prevent the second link from sliding through the rail opening and the opening defined by the frame rail in the offset collision.

* * * * *